United States Patent [19]

Rosinski

[11] 3,855,388

[45] Dec. 17, 1974

[54] METHOD OF PREPARING AN OXIDATION CATALYST FOR PARTIALLY COMBUSTED GASES

[75] Inventor: Edward J. Rosinski, Deptford, N.J.

[73] Assignee: Mobil Oil Company, New York, N.Y.

[22] Filed: Jan. 11, 1971

[21] Appl. No.: 105,743

[52] U.S. Cl. .............................. 423/213.2, 252/465
[51] Int. Cl. ............................................. B01j 11/22
[58] Field of Search ...................... 252/465; 23/2 E

[56] References Cited
UNITED STATES PATENTS

| | | | |
|---|---|---|---|
| 2,937,490 | 5/1960 | Calvert | 23/2 E |
| 3,072,458 | 1/1963 | Page | 23/2 E |
| 3,455,843 | 7/1969 | Briggs et al. | 252/465 X |
| 3,532,457 | 10/1970 | Koepernik | 252/465 X |
| 3,669,906 | 6/1972 | Koberstein et al. | 252/465 |
| 3,787,322 | 1/1974 | Koberstein et al. | 252/465 |

FOREIGN PATENTS OR APPLICATIONS

| | | | |
|---|---|---|---|
| 1,168,075 | 10/1969 | Great Britain | 252/465 |

*Primary Examiner*—Daniel E. Wyman
*Assistant Examiner*—W. J. Shine
*Attorney, Agent, or Firm*—Andrew L. Gaboriault; Raymond W. Barclay

[57] ABSTRACT

A copper chromite-containing catalyst is prepared by intimately admixing in the solid state a source of copper chromite and an alumina-containing support material, and drying the resulting product generally after forming the same into desired particle form. The use of such catalyst to treat exhaust gases from internal combustion engines is described.

5 Claims, No Drawings

METHOD OF PREPARING AN OXIDATION CATALYST FOR PARTIALLY COMBUSTED GASES

BACKGROUND OF THE INVENTION

1. Field of the Invention

This invention pertains to the treatment of gaseous materials to effect oxidation and/or reduction of components thereof. In one aspect, it relates to oxidation of partially combusted gases. According to a particular aspect, it pertains to an oxidation catalyst for the treatment of internal combustion exhaust fumes.

2. Description of the Prior Art

The catalytic oxidation and reduction of hydrocarbons and other organic and inorganic gases has received great attention in recent years. The primary reason for this increased interest is the problem of air polution, which has become of great concern in many cities.

The air in most cities contains substantial quantities of both oxides of nitrogen and products from the incomplete combustion of organic fuel. In the presence of sunlight, photolysis of the oxides of nitrogen leads to the formation of measurable quantities of ozone. The ozone, in turn, reacts with various organic pollutants to form compounds which can cause the many undesirable manifestions of smog, such as eye irritation, visibility reduction, and plant damage. When meterological conditions prevent the rapid dispersion of pollutants, a smog condition results. One source of organic pollutants is derived from unburned or partially burned gasoline in auto exhausts. Carbon monoxide is another pollutant causing much concern because of its toxic nature. Auto exhaust is also one source of this pollutant.

Many attempts have been made to solve the problem of pollution from exhaust emissions. It has been realized that the most practical way to treat exhaust fumes to reduce hydrocarbon and carbon monoxide pollution is to oxidize the hydrocarbons to carbon dioxide and water, to oxidize the carbon monoxide to carbon dioxide, and to eliminate nitrogen oxides by catalytic reduction with a reducing agent such as carbon monoxide.

A wide selection of oxidation catalysts have been produced in the past, varying both in chemical composition and physical structure. With respect to chemical composition, the ability of a great variety of metals and metal oxides, either alone or in combination, to catalyze the complete oxidation of hydrocarbons has been noted.

Additionally, catalysts comprising a porous base support material such as alumina, silica-alumina, etc. impregnated with copper and chromium-containing compounds capable of forming copper chromite have been used to oxidize hydrocarbon and inorganic pollutants in internal combustion engine exhaust gases.

Such catalysts, however, have not been commercially employed due to their relatively short catalyst life.

Thus, to be adequately efficient in the removal of hydrocarbons and carbon monoxide from auto exhaust gases and to meet standards of maximum emission currently under consideration in the legislatures of a number of states, the catalysts for treating exhaust gases must become efficient within a very few minutes after engine start-up and must maintain its activity throughout the various modes of engine operation.

SUMMARY OF THE INVENTION

A new copper chromite-containing catalyst and method for preparing the same have been discovered, which result in a catalyst possessing a longer life than the impregnated copper chromite catalysts known heretofore. More particularly, it has been found that a catalyst prepared by intimately admixing in the solid state (1) a catalytic support comprising primarily alumina and (2) a source of copper chromite, and drying the resulting product, generally after forming the same into desired particle form, results in a catalyst having extended catalyst life and being particularly suitable for use in the treatment of internal combustion exhaust fumes.

DESCRIPTION OF THE PREFERRED EMBODIMENTS

The base or support employed in the catalyst of the present invention comprises primarily alumina, which may contain up to about 20 percent by weight of other inorganic oxides such as silica, zirconia, magnesia, titania, and the like. Typical forms of alumina include amorphous, alpha monohydrate, alpha trihydrate, beta trihydrate, pseudo boehmite, gamma alumina, chi alumina, kappa alumina, beta alumina, eta alumina, and alpha alumina.

The alumina component that is initially admixed with the source of copper chromite must be in at least a partially hydrated state. That is to say, the alumina component may either be completely in the hydrated state, or may be a mixture of hydrated and non-hydrated alumina with the proviso that more than 20 percent by weight of such mixture is in the hydrated state.

Since most auto exhaust catalysts exhibit intraparticle diffusion limitations at vehicle-operating conditions, the size of the catalyst particle has a definite effect on the effective catalyst activity. Therefore, the particle size of the catalyst should be maintained as small as possible consistent with good physical durability and other restrictions of the converter system such as pressure drop. The size should desirably be less than ¼ inch in diameter, and preferably is ⅛ inch diameter or less.

The copper chromite component of the present catalyst is a source of copper chromite. This may be either copper chromite as such or a precursor which on calcination yields copper chromite.

By copper chromite is meant a crystalline material which upon analysis has a $CuO/Cr_2O_3$ molar ratio of 0.3 to 3, and more advantageously, a molar ratio of 0.5 to 2.

Suitable precursors of copper chromite comprise mixtures of a copper-containing compound, such as $CuO$, $Cu_2(OH)_2O$, or $Cu(OH)_2$, with a chromium-containing compound such as $Cr(OH)_3$, $Cr_2(OH)_4O$, $Cr(OH)O$, $Cr_2O_3$, $(NH_4)_2Cr_2O_7$, or $(NH_4)_2CrO_4$.

The catalyst of the present invention is prepared by intimately admixing the alumina component and the copper chromite component in the solid state. After admixture, the resulting product is formed into suitably shaped particles by utilizing well known techniques, such as extrusion, nodulizing, pilling, tabletting, spray drying, casting, and the like.

Such admixture may contain water in varying amounts, the amount of water generally depending on the method of particle formation. For example, in extrusion the admixture must be of sufficient plasticity as to readily pass through the extrusion die, and hence the admixture usually will contain water in an amount up to about 50 percent by weight of the extruder feed. For nodulization, the water content may be as high as 60 percent by weight based on the solids content of the formed nodules For pilling and tabletting, the water content is generally less then 35 percent by weight based on the solids content, but may be as high as 50 percent by weight. For spray drying, the water content in the slurry feed to the spray drier may be as high as 95 percent by weight. For casting the water content of the feed material may be as high as 50 percent by weight.

According to one preferred method of extrusion, the alumina component, copper chromite source, and water are intimately physically admixed. If desired, an extrusion aid such as, for example, polyvinyl alcohol, carboxy methyl cellulose, graphite, stearic acid, starches, or the like may also be incorporated in the extruder feed in an amount generally less than 5 percent by weight of the feed. The mixture is then extruded in a manner well known in the art, such as, for example, through an auger extruder. The extrudate then is heated to remove substantially all of the water. The extrudate may be cut or broken to desired pieces either before or after removal of water.

According to another desirable method, the base or catalyst support comprising primarily alumina is introduced to a nodulizer along with a copper chromite source. Any suitable type of nodulizer may be employed, for instance a nodulizer comprising a pan about 3 feet in diameter and about 18 inches deep. The pan is rotated at a predetermined speed and tilted at about 20° to 45° to the horizontal. If water has not previously been added to the alumina component, it is added as a spray to the nodulizer, generally in an amount of up to about 50 percent by weight of the alumina component. The size of the nodules will depend upon the nodulizing conditions, such as residence time in the nodulizer, speed of pan rotation, rate of feed, etc. Substantially uniform size nodules can be produced, for example, in the size range of ¼ inch by 8 mesh in diameter. The resulting nodules are desirably aged to harden them, this aging occurring prior to final drying to remove substantially all of the water therefrom. Such aging is advantageously effected by permitting the wet nodules from the nodulizer to remain in sealed storage containers for a suitable period of time, for instance, 24 hours at a temperature at about 80° C. It is to be understood, however, that such aging can also be accomplished using either lower temperatures such as ambient temperatures and a longer period of time, or higher temperatures and a shorter period of time.

After the foregoing aging step, the nodules are dried under heating to remove substantially all of the water therefrom.

For tabletting, in addition to employing an extrusion aid as referred to above, there may also be employed a tabletting lubricant, for example, polyacrylamide.

The amount of copper chromite present in the resulting catalyst composite is generally from about 5 to 50 percent by weight based on the overall composite, and preferably from about 10 to 30 percent by weight The following examples will further illustrate the invention. All parts are by weight unless otherwise stated.

A series of four copper chromite-containing catalysts, designated Catalysts A, B, C and D, were prepared using (1) the impregnation techniques of the prior art and (2) co-extrusion in accordance with one aspect of the invention. These catalysts were aged and then evaluated for catalytic activity.

EXAMPLE 1

Catalyst A: 20% $CuO \cdot Cr_2O_3$/80% $Al_2O_3$ (Co-extrusion)

Copper chromite was prepared as follows:

A copper nitrate solution was prepared by dissolving 7.68 lb. of $Cu(NO_3)_2 \cdot 3H_2O$ and 23 ml of 70% $HNO_3$ in 28.2 lbs. of water. A basic chrome solution was prepared by dissolving 4.44 lbs. of $(NH_4)_2Cr_2O_7$ and 4.8 lbs. of 29.6% $NH_3$ in 28.2 lbs. of water. The two solutions were each heated to 150°F, then mixed thoroughly and held at 150°F for ½ hour. The resulting red-brown precipitate was filtered on large Buchner funnels and washed with approximately 10 gallons of water. The wet filter cake was dried for 16 hours at 250°F and calcined for 3 hours at 800°F using an air purge. The blue-black powder obtained was copper chromite having an approximate composition of 2 $CuO \cdot Cr_2O_3$.

In four separate batches, 343 grams of alpha-$Al_2O_3 \cdot H_2O$ containing 27% moisture and 7.6% $SiO_2$ on an ignited basis were charged with 270 grams of water to one gallon jars. The jars were sealed and placed in a 125°F bath for 4 hours. The jars were then removed from the bath and all material was combined.

150 grams of the blue-black calcined copper chromite were mixed with 2000 grams of 10 percent by weight acetic acid solution for 15 minutes and filtered. The wet cake was then washed for 2 liters of water. 115 grams of this wet cake containing 52.5% moisture were mixed with 535 grams of the above heat-treated alumina in a Muller mixer. The mix was then extruded through a 1/25 inch die using a hydraulic ram. The extrudate was dried for 66 hours at 250°F and calcined for 3 hours at 1,400°F with 3 volumes air per minute per volume of catalyst flowing through the catalyst bed.

EXAMPLE 2

Catalyst B: 16.7% $CuO \cdot Cr_2O_c$/83.3% $Al_2O_3$ (Vacuum Impregnation)

650 gm of hydrated alumina prepared as described in Example 1 were extruded two passes through a 1/25 inch die using a hydraulic extruder. The extrudate was dried 16 hours at 250°F and calcined for 3 hours at 1,000°F in air. To prepare an impregnating solution, 96.0 gm $(NH_4)_2Cr_2O_7$, 80.0 gm $Cu(NO_3)_2 \cdot 3H_2O$ and 1.0 ml 70% $HNO_3$ were dissolved in 200 ml water. The solution was then diluted with water to 300 ml total volume. One hundred grams of calcined alumina extrudate were charged to a vacuum flask and evacuated ½ hour with a vacuum pump. 75.0 ml of the above solution were then admitted to the alumina base and the mixture was rolled for 5 minutes. The impregnated base was then dried 16 hours at 250°F, and calcined 3 hours at 1,400°F in air. The resulting catalyst contained 5.5% CuO and 11.2% $Cr_2O_3$.

EXAMPLE 3

Catalyst C: 20% $CuO \cdot Cr_2O_3$/80% $Al_2O_3$ (Co-extrusion)

700 grams of alpha-$Al_2O_3 \cdot H_2O$ and 106 grams of a cellulose fiber (Solka-Floc BW-40), to impart porosity to the final catalyst products, were dry-mixed for 15 minutes and placed in a one gallon jar. 500 ml of water were added and the jar was sealed, and then placed in a 200°F bath for 16 hours. 131 grams calcined copper chromite powder prepared as in Example 1 were charged with the above mixture to a Muller mixer. The mix was mulled for ½ hour, adding 25 grams of 2% wt. of water-soluble polysaccharide gum (extrusion aid) and 55 ml of water to obtain an extrudable consistency. The mixture was then extruded one pass through a 1/25 inch die using an auger extruder. The extrudate was dried 16 hours at 250°F and calcined 3 hours at 1,400°F in air.

EXAMPLE 4

Catalyst D: 19% $CuO \cdot Cr_2O_3/81\%$ $Al_2O_3$ (Vacuum impregnation)

700 grams of alpha-$Al_2O_3 \cdot H_2O$ containing 25% moisture were blended with 106 grams of a cellulose fiber (Solka-Floc BW-40). The mixture was placed in a one gallon jar, and 500 grams of water were added. The jar was sealed and placed in a 200°F bath for 16 hours. The material was then removed from the bath and mixed for ½ hour in a Muller mixer to obtain an extrudable consistency. The material was then extruded one pass through a 1/16 inch die using an auger extruder. The extrudate was dried 16 hours at 250°F and calcined 3 hours at 1,000°F in air.

To prepare the impregnating solution, 55.8 grams of $(NH_4)_2Cr_2O_7$, 113.6 grams of $Cu(NO_3)_2 \cdot 3H_2O$, and 1.2 ml of 70% $HNO_3$ were dissolved in sufficient water to bring the total volume of solution to 200 ml.

100 grams of the calcined alumina extrudate were charged to a vacuum flask and evacuated for ½ hour. 66 ml of the above solution were vacuum impregnated into the alumina base. The material was then dried at 250°F for 16 hours and calcined for 3 hours at 1,400°F in air. The resulting catalyst contained 10% by wt. CuO and 9% by wt. $Cr_2O_3$.

A series of copper chromite-containing catalysts, designated Catalysts E and F, were prepared using a co-nodulization process in accordance with the present invention. These catalysts were aged and then evaluated for catalytic activity.

EXAMPLE 5

Catalyst E 20 pounds of copper chromite, prepared as in Example 1, were intimately admixed with 80 pounds of previously prepared alumina powder. The alumina powder had been prepared as described in U.S. Pat. No. 3,222,129, issued Dec. 7, 1965. Thus, alumina hydrate particles were thrust directly into a sustained, fuel-fired flame combustion zone. In this manner, the alumina hydrate particles were completely surrounded by the fuel-air mixture and were maintained within the flame for a sufficient period of time to ensure the partial calcination of each of the particles. The flame was maintained at a temperature in the range of 3,000° to 3,500°F. Immediately after calcination, that is, upon passage of the particles through the flame, the partially calcined alumina material was rapidly quenched to a temperature of 500° to 750°F. The partially calcined alumina produced was then further cooled and ground to a fine particle size, about 80% minus 325 mesh.

The resulting powder admixture was then nodulized in a rotating pan nodulizer. After nodulization the spheres were cured by allowing them to remain in a sealed container overnight at 70°–80°C. Subsequently, the catalyst was dried at 250°F and calcined 3 hours at 1,400°F in air. The composition of the finished catalyst as determined after calcination was 12.1% CuO, 11.2% $Cr_2O_3$ and the remainder $Al_2O_3$.

EXAMPLE 6

Catalyst F 27.5 pounds of the dried, uncalcined copper chromite precursor prepared as in Example 1 was blended with 80 pounds of alumina powder of the type employed in Example 5. The blended powders were then nodulized in a rotating pan nodulizer. After nodulizing the spheres were aged overnight in their own atmosphere at about 70°C. Subsequently, the catalyst was dried at 250°F and calcined 3 hours at 1,400°F in air. The composition of the catalyst as determined after calcination was 10% CuO, 9.2% $Cr_2O_3$ and the remainder $Al_2O_3$.

EXAMPLE 7

Catalyst G: (Soak impregnation)

To prepare the impregnating solution, 11.25 lb. of $(NH_4)_2Cr_2O_7$, were dissolved in 40.6 lb. of water. When all of the ammonium dichromate was in solution, 6.85 lb. of $Cu(NO_3)_2 \cdot 3H_2O$ were added to the solution and dissolved.

25 lbs. of alumina spheres, 8–10 mesh (KA-101) were weighed into a large screen basket. The basket and contents were lowered into a plastic bucket containing the solution, so that all of the base was completely immersed. The base was allowed to soak for one hour at room temperature. The basket was then removed from the solution, drained, and the soaked base spread 1 inch deep onto drying screens. The material was then dried for 16 hours at 250°F, and finally calcined for 3 hours at 1,400°F in air. The resulting catalyst contained 5.8% CuO and 12.2% $Cr_2O_3$, based on the total catalyst.

EXAMPLE 8

Catalyst H: 20% copper chromite/80% alumina (Co-extrusion of dried copper chromite and alumina)

Procedure 161 gm alpha alumina monohydrate (74.6% solids) and 100 grams $H_2O$ were hydrated overnight in a water bath at 200°F.

41.4 gm of dried uncalcined copper chromite prepared as in Example 1 and the above hydrated alumina were added to a Muller mixer, and water was added the mixture to the correct consistency for extrusion. The material was then extruded to produce 1/16 inch extrudate. The extrudate was dried at 250°F overight and thereafter was calcined at 1,400°F for 3 hours.

Catalyst Evaluation

The foregoing catalyst samples were each aged on a 120 tube converter (described more fully below) for periods of time corresponding to different mileage accumulations and then the hydrocarbon and carbon monoxide rate constants for the aged catalysts were determined.

The catalyst aging procedure was as follows:

120 tubes (1 inch diameter and 3 inch length) of a multitube downflow converter, each tube containing a 20–30 gram sample of the catalyst to be aged, these tubes being adapted for the passage of equal amounts of exhaust gas therethrough, were mounted in the exhaust line of a Ford 302-2V cubic inch V-8 engine. The operation of this engine was controlled by a magnetic tape-program unit. The temperature of engine operation did not exceed 1,350°F. The fuel was premium grade 99 Research Octane Number (RON). The lead content was either one half or 3 grams of lead per gallon (expressed as lead tetraethyl) as detailed in the subsequent tables.

During catalyst aging (simulated mileage accumulation), the operating program used consisted of:

Seven 5-hour simulated city-suburban driving periods each followed by rapid cooling to room temperature.

An eighth simulated city-suburban driving period followed by a high speed cruise period and rapid cooling.

This program was repeated until the desired mileage accumulation was obtained.

The driving cycle employed in the simulated city-suburban period consisted of 22 separate operational modes which were repeated every 444 seconds. The cycle involved 8.1% idling, 19.4% accelerating, 54.5% cruising and 18.0% decelerating. The average design speed for this cycle was about 30.5 mph. It was controlled by the magnetic tape unit and was repeated over and over again for the entire five hours of a simulated city-suburban driving period.

Rapid cooling of the engine and converter to room temperature took 1 hour. This was done by removing the insulation from the catalyst tubes, circulating refrigerated coolant through the engine and blowing cold air on the carburetor and the catalyst tubes.

The high speed cruising period also lasted for one hour This period was a manually controlled 60 mph operation.

The activity of the catalysts is presented as the first order reaction rate constants for carbon monoxide, $k_{CO}$, and propylene, $k_{C_3H_6}$.

The activity test procedure comprises passing a reaction gas comprising 4.4% vol. $O_2$, 0.91% vol. CO, 10% vol. $CO_2$, 390 ppm $C_3H_6$ and the remainder $N_2$, the gas having been saturated with 10% vol. $H_2O$, over a bed of the specific catalyst at about 750°F. The amount of CO converted is then measured by the reduction in concentration of this compound in the reactor exit gas stream. The first order rate constant at a given temperature is calculated from the reaction gas flow rate, inlet and outlet concentrations of CO, reactor pressure and catalyst volume by the following equation:

$$k_n = F/V \ln C_i/C_o$$

wherein $k_n$ = first order reaction rate constant for nth component (CO) or ($C_3H_6$)
$C_i$ = inlet concentration of nth component
$C_o$ = outlet concentration of nth component
$F$ = reaction gas flow rate at reaction conditions, cc/sec
$V$ = particle volume of catalyst charged to the reactor, cc Inasmuch as the flow rate is measured at standard temperature and pressure before saturation with water, it must be corrected for reactor temperature, pressure and water content. The particle volume of the catalyst is determined by dividing the weight of catalyst charged by the particle density of the catalyst.

As previously noted, Catalysts A and C, representing the catalysts and one of the preparative methods of the present invention, were prepared by co-extruding an alumina base with copper chromite. Catalysts B and D were prepared using the prior art impregnation technique.

The results of the activity analyses of aged samples of Catalysts A, B, C, and D, the analyses and aging being carried out according to the procedure described hereinabove, are set forth in the following table.

TABLE 1*

| Catalyst | Composition | Simulated Accumulated Mileage | $k_{CO}$ at 750°F | $k_{C_3H_6}$ at 750°F |
|---|---|---|---|---|
| A | 20% CuO·Cr$_2$O$_3$ 80% alumina | 0 2600 5500 | 136 23 11 | 109 31 16 |
| B | 16.7% CuO·Cr$_2$O$_3$ 83.3% alumina | 0 2600 5500 | 118 8 7 | 97 13 10 |
| C | 20% CuO·Cr$_2$O$_3$ 80% alumina | 0 3000 6000 9000 | 376 73 25 16 | 214 36 14 7 |
| D | 19% CuO·Cr$_2$O$_3$ 81% alumina | 0 3000 6000 9000 | 322 35 16 11 | 176 21 8 2 |

*The fuel used contained 3 grams of lead (as TEL) per gallon.

As shown in the Table, Catalysts A and C, wherein the copper chromite was incorporated by the co-extrusion method of the present invention, possess substantially increased stability as compared with Catalysts B and D, wherein the copper chromite was incorporated by the conventional impregnation techniques.

The results of the activity analyses of aged samples of Catalysts E, F and G, are set forth in Table 2.

TABLE 2*

| Catalyst | Composition | Simulated Accumulated Mileage | $k_{CO}$ at 750°F | $k_{C_3H_6}$ at 750°F |
|---|---|---|---|---|
| E | 23.3% CuO·Cr$_2$O$_3$ 76.7% Al$_2$O$_3$ | 0 21,000 | 179 7.3 | 73 7.2 |
| F | 19.2% CuO·Cr$_2$O$_3$ 80.8% Al$_2$O$_3$ | 0 21,000 | 310 11.2 | 116 10.1 |
| G | 18% CuO·Cr$_2$O$_3$ 83% Al$_2$O$_3$ | 0 19,000 | 289 5.6 | 147 8.4 |

*The fuel used contained one half gram of lead (as TEL) per gallon.

As shown by the foregoing data, where copper chromite was incorporated by co-nodulizing in accordance with the present invention (Catalysts E and F), the catalysts showed superior stability as contrasted to Catalyst G, wherein the copper chromite was incorporated by conventional impregnation.

The results of the activity analyses of aged samples of Catalyst D and H are set forth in Table 3.

TABLE 3*

| Catalyst | Composition | Simulated Accumulated Mileage | $k_{CO}$ at 750°F | $k_{C_3H_6}$ at 750°F |
|---|---|---|---|---|
| D | 19% CuO·Cr$_2$O$_3$ 81% Al$_2$O$_3$ | 0 15,000 | 322 40 | 176 38 |
| H | 20% CuO·Cr$_2$O$_3$ 80% Al$_2$O$_3$ | 0 19,000 | 258 87 | 145 53 |

*The fuel used contained one half gram of lead (as TEL) per gallon.

From the data given in Table 3, it can be seen that Catalyst H, wherein the copper chromite was incorporated by co-extrusion of the dried precursor of copper chromite, is markedly more stable than Catalyst D, the impregnated catalyst, notwithstanding the fact that Catalyst D is smalled in particle size than Catalyst H (1/25 inch vs 1/16 inch).

Variations can, of course, be made without departing from the spirit and scope of the invention.

Having thus described the invention, what is desired to be secured by Letters Patent and hereby claimed is:

1. A method of preparing a catalyst containing from about 10 to 30 percent by weight copper chromite, this method comprising intimately admixing in the solid state (1) a support comprising primarily alumina at least 20 percent of which is in the hydrated state and (2) a source of copper chromite, said copper chromite being of the formula $CuO/Cr_2O_3$ wherein the molar ratio of CuO to $Cr_2O_3$ is from 0.3–3:1, said source of copper chromite being selected from the group consisting of copper chromite and a mixture of a coppercontaining compound and a chromium-containing compound, which mixture on calcination yields copper chromite, said coppercontaining compound being selected from the group consisting of CuO, $Cu_2(OH)_2O$, $Cu(OH)_2$, and mixtures thereof, and said chromium-containing compound being selected from the group consisting of $Cr_2O_3$, $Cr_2(OH)_3$, $Cr_2(OH)_2O$, $Cr(OH)O$, $(NH_3)_2Cr_2O_7$, $(NH_4)CrO_4$, and mixtures thereof, the proportions of said support and said source of copper chromite being such as to provide from 10 to 30 percent by weight of copper chromite in the final dried catalyst, shaping the resulting product, drying said product to remove substantially all of the water therefrom and calcining said product.

2. The method of claim 1 wherein said support is selected from the group consisting of amorphous alumina, alpha alumina monohydrate, alpha alumina trihydrate, beta alumina trihydrate, pseudo boehmite, gamma alumina, chi alumina, kappa alumina, beta alumina, eta alumina, alpha alumina, and mixtures thereof.

3. The method of claim 1 wherein said intimate admixture contains water in an amount up to about 50 percent by weight of the overall composition and wherein said intimate admixing step includes extruding said water-containing admixture.

4. The method of claim 1 wherein said intimate admixture contains water, said intimate admixing step including nodulizing said water-containing admixture to form nodules therefrom, the amount of water present in said admixture being such that the water content of the resulting nodules is up to about 60 percent by weight of the solids content of said nodules.

5. A method of oxidizing oxidizable hydrocarbons and carbon monoxide present in exhaust gases from internal combustion engines comprising passing said gases, in the presence of an oxygen-containing gas, through a bed containing a catalyst prepared by the method of claim 1.

* * * * *

UNITED STATES PATENT OFFICE

CERTIFICATE OF CORRECTION

Patent No. 3,855,388    Dated December 17, 1974

Inventor(s) EDWARD J. ROSINSKI

It is certified that error appears in the above-identified patent and that said Letters Patent are hereby corrected as shown below:

Column 4, line 43, "$CuO \cdot Cr_2O_c/83.3\%$" should be --$CuO \cdot Cr_2O_3/83.3\%$--.

Column 9, line 29, "$Cr_2(OH)_3$" should be --$Cr(OH)_3$--.

Signed and sealed this 8th day of April 1975.

(SEAL)
Attest:

RUTH C. MASON
Attesting Officer

C. MARSHALL DANN
Commissioner of Patents
and Trademarks